United States Patent
Dandekar et al.

(10) Patent No.: US 10,769,127 B2
(45) Date of Patent: Sep. 8, 2020

(54) DYNAMICALLY OPTIMIZING DATA ACCESS PATTERNS USING PREDICTIVE CROWDSOURCING

(71) Applicant: QUEST SOFTWARE INC., Aliso Viejo, CA (US)

(72) Inventors: Shree A. Dandekar, Cedar Park, TX (US); Mark W. Davis, Tracy, CA (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 444 days.

(21) Appl. No.: 14/738,087

(22) Filed: Jun. 12, 2015

(65) Prior Publication Data
US 2016/0364423 A1 Dec. 15, 2016

(51) Int. Cl.
*G06F 16/22* (2019.01)

(52) U.S. Cl.
CPC ...... *G06F 16/2272* (2019.01); *G06F 16/2228* (2019.01)

(58) Field of Classification Search
CPC .......... G06F 17/30336; G06F 16/2228; G06F 16/2272; G06N 5/047
USPC ........................................................ 707/715
See application file for complete search history.

(56) References Cited

U.S. PATENT DOCUMENTS

| | | | |
|---|---|---|---|
| 7,570,796 B2 | 8/2009 | Zafar et al. | |
| 8,041,103 B2 | 10/2011 | Kulkarni et al. | |
| 8,209,317 B2* | 6/2012 | Joshi | G06F 16/951 707/706 |
| 8,473,480 B1* | 6/2013 | Hu | G06F 21/645 707/705 |
| 8,559,682 B2 | 10/2013 | Zhang et al. | |
| 8,971,641 B2* | 3/2015 | Buchmueller | G06F 16/532 382/209 |
| 9,037,568 B1* | 5/2015 | Xian | G06F 16/24578 707/713 |
| 9,279,695 B2* | 3/2016 | Rolf | G01C 21/3679 |
| 9,665,647 B2* | 5/2017 | Kasterstein | G06F 16/316 |
| 9,710,456 B1* | 7/2017 | Mengle | G06F 40/30 |
| 10,061,767 B1* | 8/2018 | Mengle | G06F 40/30 |
| 2012/0030186 A1* | 2/2012 | Joshi | G06F 16/951 707/706 |
| 2012/0155778 A1* | 6/2012 | Buchmueller | G06F 16/532 382/209 |
| 2013/0151492 A1* | 6/2013 | Kirihata | G06F 16/134 707/696 |

(Continued)

OTHER PUBLICATIONS

QLIK, http://www.qlik.com/, printed Feb. 1, 2016.
Power Pivot, http://www.powerpivotpro.com/what-is-power-pivot/, printed Feb. 1, 2016.

*Primary Examiner* — Phong H Nguyen
(74) *Attorney, Agent, or Firm* — Maschoff Brennan (57) ABSTRACT

A system, method, and computer-readable medium for performing a dynamic data index restructure operation. The dynamic data index restructure operation restructures the data indexes within a business intelligence architecture based on usage patterns so as to support queries most likely to be generated by users of the business intelligence architecture. In certain embodiments, the dynamic data index restructure operation is performed via a dynamic data index restructure agent which may be positioned between a business intelligence application and the business intelligence database.

17 Claims, 3 Drawing Sheets

(56) References Cited

U.S. PATENT DOCUMENTS

2014/0250098 A1\* 9/2014 Kasterstein ............ G06F 16/951
                                                                      707/709

\* cited by examiner

DYNAMICALLY OPTIMIZING DATA ACCESS PATTERNS USING PREDICTIVE CROWDSOURCING

BACKGROUND OF THE INVENTION

Field of the Invention

The present invention relates to information handling systems. More specifically, embodiments of the invention relate to dynamically optimizing data access patterns using predictive crowdsourcing.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to couple a plurality of information handling systems to provide a business intelligence architecture. In known business intelligence architectures, querying operations which retrieve data from disk storage is often the slowest part of data processing the business intelligence querying operations. Additionally, the more data required by components or users of the business intelligence architecture, the more the retrieval of that data slows down the analytics process. One method for addressing this issue is to pre-process data in some way (e.g., via cubes, query sets, aggregate tables, etc.) so information handling system using the data can retrieve a smaller number of records. However, pre-processing can often require accurate predictions of what data should be selected and how the data should be arranged for analysis. If and/or when more or different data is needed, a new prediction regarding pre-processing the data is needed.

Certain in-memory databases approach the querying issue by loading an entire dataset into faster access memory such as local non-volatile memory (e.g., random access memory (RAM)). Such a process can remove or reduce the need to access the disk to run queries, thus gaining an immediate and substantial performance advantage (because scanning data in the local non-volatile memory is orders of magnitude faster than reading the same data from a disk).

Some implications to using in-memory technology include the amount of data you can query with in-memory technology is limited by the amount of free non-volatile memory available, and there is almost always much less available non-volatile memory than available disk space. It is theoretically possible to add additional non-volatile memory, however the hardware for interacting with the database then becomes much more expensive. Additionally, the amount of required non-volatile memory is not only affected by the amount of data, but also by the number of people querying the data. For example, having five to ten users accessing the same in-memory business intelligence application could easily double the amount of non-volatile memory required for intermediate calculations that need to be performed to generate the query results. Other implications include having to re-load from disk to the non-volatile memory every time the information handling system reboots and not being able to use the information handling system for anything other than the particular data model as the non-volatile memory is substantially consumed with storing the data to execute a particular data model.

Accordingly, it would be desirable to provide alternate methods to circumvent some of these inherent limitations of known business intelligence architectures.

SUMMARY OF THE INVENTION

A system, method, and computer-readable medium are disclosed for performing a dynamic data index restructure operation. The dynamic data index restructure operation restructures the data indexes within a business intelligence architecture based on usage patterns so as to support queries most likely to be generated by users of the business intelligence architecture. In certain embodiments, the dynamic data index restructure operation is performed via a dynamic data index restructure agent which may be positioned between a business intelligence application and the business intelligence database. In certain embodiments, the dynamic data index restructure operation includes a predictive engine that speculates data access patterns based on a certain number of retrieved queries (e.g., the top 15 percent of retrieved queries) from users accessing the database within the business intelligence architecture. In certain embodiments, the dynamic data index restructure operation uses predictive crowdsourcing to estimate the query patterns and optimizing the data access for complex queries. Additionally, in certain embodiments, the predictive engine is customizable to retrieve query patterns based upon predefined criteria. In certain embodiments, the predefined criteria can include one or more of certain products (e.g., the top performing products), region, as well as predefined users of the database (e.g., the users who are most active, have an indicated importance within an organization (e.g., a certain job title or rank above a certain level) or have more than a predefined amount of experience working with the database).

More specifically, in certain embodiments, the dynamic data index restructure operation interacts with a pattern usage database which captures data access information including crowdsourced data access information. Also, in certain embodiments, the dynamic data index restructure operation includes a Heuristic engine which retrieves and predicts queries substantially in real time. Additionally, in certain embodiments, the dynamic data index restructure operation monitors and stores data access pattern searches by acting as a mediator between business intelligence applications and databases accessed by the business intelligence applications. Also, in certain embodiments, the dynamic data index restructure agent is light weight (i.e., the agent is designed to use intelligence to automatically carry out an assigned task, mainly retrieving and delivering information) and can connect to data sources stored in a datacenter within an enterprise firewall as well as in the cloud.

For example, suppose a user of the business intelligence architecture repeatedly accesses quarterly sales information (e.g., via a GroupBys operation) to populate a sales chart when performing a sales chart operation. The dynamic data index restructure agent, which is monitoring the database within the business intelligence architecture, recognizes a pattern with respect to the quarterly sales information and pre-generates the quarterly sales information in anticipation of any future requests.

To further this example, suppose users who retrieve the quarterly sales information also, with a certain amount of regularity, retrieve information regarding a certain number of top performing products by region soon after obtaining the quarterly sales information. The predictive engine can then speculates that the information regarding a certain number of top performing products by region will be requested soon after the request for the quarterly sales information. According, the dynamic data index restructure agent pre-generates the information regarding top performing products in anticipation of any future requests.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
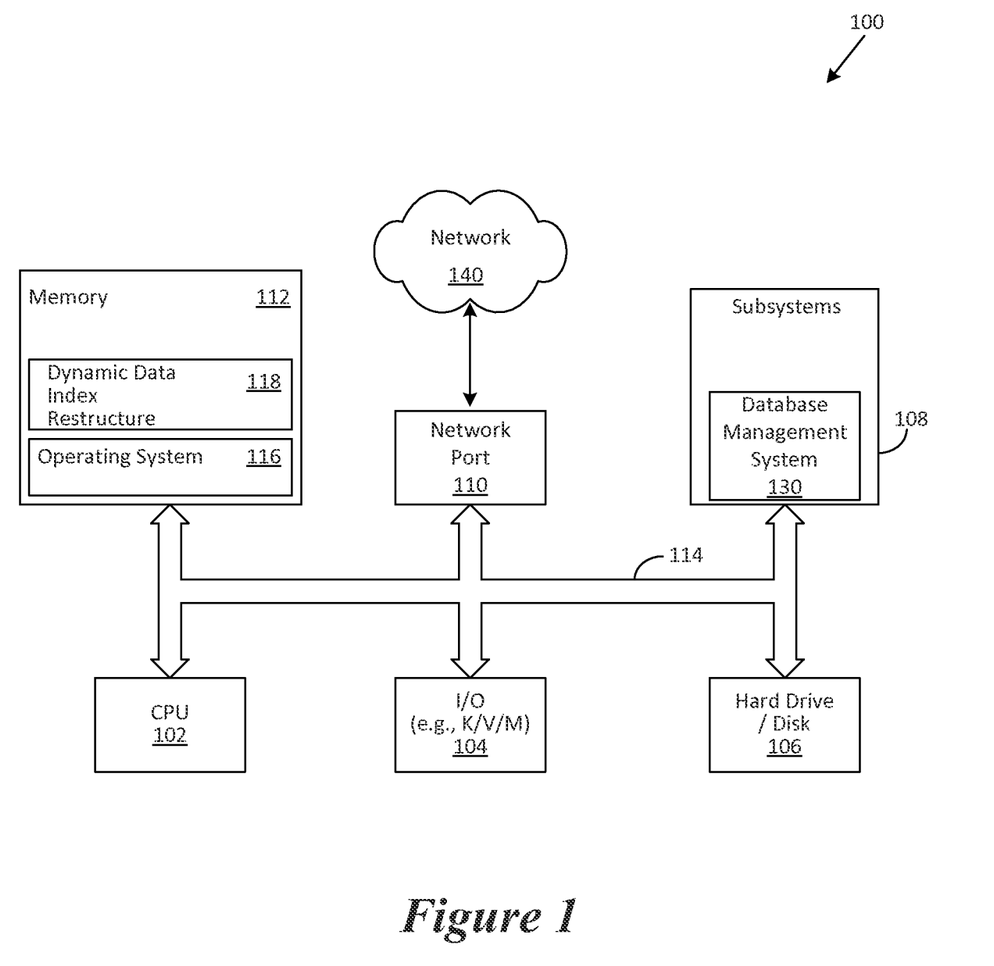
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a dynamic data index restructure module 118. The information handling system 100 can also include a database management system 130.

The dynamic data index restructure module performs a dynamic data index restructure operation. The dynamic data index restructure operation restructures the data indexes within a business intelligence architecture based on usage patterns so as to support queries most likely to be generated by users of the business intelligence architecture. In certain embodiments, the dynamic data index restructure operation is performed via a dynamic data index restructure agent which may be positioned between a business intelligence application and the business intelligence database. In certain embodiments, the dynamic data index restructure operation includes a predictive engine that speculates data access patterns based on a certain number of retrieved queries (e.g., the top 15 percent of retrieved queries) from users accessing the database within the business intelligence architecture. In certain embodiments, the dynamic data index restructure operation uses predictive crowdsourcing to estimate the query patterns and optimizing the data access for complex queries. Additionally, in certain embodiments, the predictive engine is customizable to retrieve query patterns based upon predefined criteria. In certain embodiments, the predefined criteria can include one or more of certain products (e.g., the top performing products), region, as well as predefined users of the database (e.g., the users who are most active, have an indicated importance within an organization (e.g., a certain job title or rank above a certain level) or have more than a predefined amount of experience working with the database).

More specifically, in certain embodiments, the dynamic data index restructure operation interacts with a pattern usage database which captures data access information including crowdsourced data access information. Also, in certain embodiments, the dynamic data index restructure operation includes a Heuristic engine which retrieves and predicts queries substantially in real time. Additionally, in certain embodiments, the dynamic data index restructure operation monitors and stores data access pattern searches by acting as a mediator between business intelligence applications and databases accessed by the business intelligence applications. Also, in certain embodiments, the dynamic data index restructure agent is light weight and can connect to data sources on prem as well as in the cloud.

Figure 2:
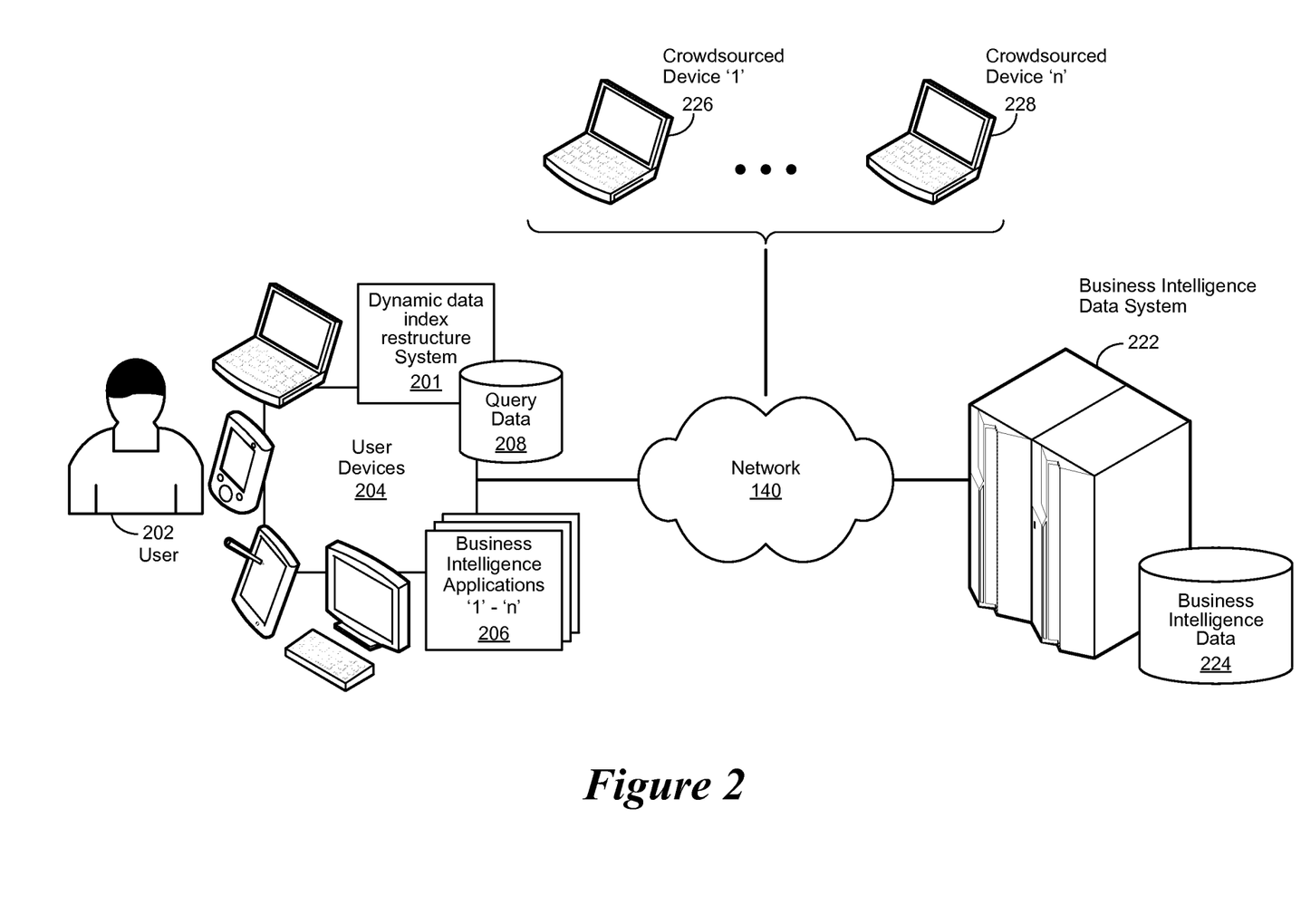
FIG. 2 shows a block diagram of a business intelligence architecture.

FIG. 2 is a simplified block diagram of a business intelligence architecture 200 implemented in accordance with an embodiment of the invention. In various embodiments, the operation of a plurality of devices are monitored to detect usage patterns based upon retrieved queries for accessing one or more business intelligence databases. In this and other embodiments, a dynamic data index restructure system 201 is implemented to execute on a user device 204 and to perform a dynamic data index restructure operation within the business intelligence architecture 200. In certain embodiments, the dynamic data index restructure operation may be performed as a hardware operation, a software operation, or a combination thereof. In certain embodiments, the dynamic data index restructure system 201 includes some or all of the functions of the dynamic data index restructure module 118.

As used herein, a user device 204 refers to an information handling system such as a personal computer, a laptop computer, a tablet computer, a personal digital assistant (PDA), a smart phone, a mobile telephone, or other device that is capable of communicating and processing data. In various embodiments, the user device can include one or more business intelligence applications 206. In various embodiments, the user device 204 includes a repository of device query profile data 208. Also, in certain embodiments the repository of device query data 208 includes a usage pattern repository. In certain embodiments, the usage pattern repository may include a usage pattern database. Also, in certain embodiments, the dynamic data index restructure system 201 and the device query profile data 208 may be physically disparate. Also, in certain embodiments, the dynamic data index restructure system may include a dynamic data index restructure agent which executes elsewhere within the business intelligence architecture 200. Skilled practitioners of the art will realize that many such embodiments are possible and the foregoing is not intended to limit the spirit, scope or intent of the invention.

In various embodiments, the user device 204 is used to communicate data between the dynamic data index restructure system 201 and a business intelligence data system 222, described in greater detail herein, through the use of a network 140. In certain embodiments, the business intelligence data system 222 includes a repository of business intelligence data 224, likewise described in greater detail herein.

In various embodiments, the business intelligence data system 222 can include one or more of a relations database management system (RDBMS), a data warehouse, and a not only structure query language (NoSQL) database. Also, in various embodiments, the business intelligence data system 222 can include one or more cloud based databases (e.g., Cloud DB1, Cloud DB2, Cloud DB3, etc.) Skilled practitioners of the art will realize that many such embodiments are possible and the foregoing is not intended to limit the spirit, scope or intent of the invention.

In various embodiments, the network 140 may be a public network, such as the Internet, a physical private network, a virtual private network (VPN), or any combination thereof. In certain embodiments, the network 140 may be a wireless network, including a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including various 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies. Skilled practitioners of the art will realize that many such embodiments are possible and the foregoing is not intended to limit the spirit, scope or intent of the invention.

As used herein, a query profile broadly refers to a profile of a query (or set of queries) that can be used as a reference for predicted queries. In various embodiments, the query profile may be generated based upon queries that are crowdsourced from a plurality of devices, such as crowdsourced devices '1' 226 through 'n' 228. As used herein, crowdsourcing broadly refers to the process of obtaining needed services, content or other information by soliciting contributions from a group of users, devices or systems. Skilled practitioners of the art will be aware that crowdsourcing is often used to subdivide tedious tasks, processes or operations across multiple contributors, each of which adds a portion of value to the greater result. In various embodiments, each of the crowdsourced devices '1' 226 through 'n' 228 provides their respective queries to the dynamic data index restructure system 201. Once received, they are stored in the repository of device query profile data 208. In various embodiments, the network 140 is used by the crowdsourced devices '1' 226 through 'n' 228 to respectively provide their queries to the device 204.

Ongoing operations are then performed to monitor queries generated via the crowdsourced devices as well as other devices accessing the business intelligence database management system 222. Skilled practitioners of the art will recognize that many methods for monitoring queries are possible and the foregoing is not intended to limit the spirit, scope or intent of the invention.

Ongoing operations are then performed to store the query data as it is collected for subsequent comparison and analysis. The method by which the query data is stored, and the format in which it is stored, is a matter of design choice. In various embodiments, the collected query data is stored in the repository of query data 208. In certain embodiments, a subset of the collected query data is stored in the repository of query data 208. For example, query data associated with the top 'n' number of users of the business intelligence architecture may be selected for storage in the repository of query data 208. Skilled practitioners of the art will recognize that many methods for identifying a top number of users are possible and the foregoing is not intended to limit the spirit, scope or intent of the invention.

Ongoing analysis operations are then performed to identify commonalities among the queries as well as common sequences (i.e., multiple queries conforming to certain patterns) associated with sets of queries.

In certain embodiments, log files of historical queries are crowdsourced as described in greater detail herein. In these embodiments, the generation of queries by members of the crowd may be variable at a given point in time, which in turn may make it difficult to identify query patterns from the crowdsources devices when only viewing queries from the crowdsourced devices for the given point in time. However, by reviewing the queries from the log files, patterns may more readily appear. Accordingly, such log files can provide useful query data that includes various combinations of queries that have been monitored over time. Furthermore, such log files may provide likewise useful data related to user activity relating to various user generated queries. Those of skill in the art will recognize that many such embodiments are possible and the foregoing is not intended to limit the spirit, scope or intent of the invention.

For example, suppose a user of the business intelligence architecture repeatedly accesses quarterly sales information (e.g., via a GroupBys operation) to populate a sales chart when performing a sales chart operation. The dynamic data index restructure agent, which is monitoring the database within the business intelligence architecture, recognizes a pattern with respect to the quarterly sales information and pre-generates the quarterly sales information in anticipation of any future requests.

To further this example, suppose users who retrieve the quarterly sales information also, with a certain amount of regularity, retrieve information regarding a certain number of top performing products by region soon after obtaining the quarterly sales information. The predictive engine can then speculates that the information regarding a certain number of top performing products by region will be requested soon after the request for the quarterly sales information. According, the dynamic data index restructure agent pre-generates the information regarding top performing products in anticipation of any future requests.

Other variations of the business intelligence architecture are contemplated. For example, the pattern usage database may be included within an intelligence platform such as the Toad Intelligence Platform (TIC) where the intelligence platform captures the data access information. Additionally, the pattern usage repository can communicate with a Heuristic engine such as a Heuristic engine included within an application integration platform such as the Boomi Atom AtomSphere Integration platform. In certain embodiments, the Heuristic engine captures the data access information in real time and predicts queries. Also, in certain embodiments, the application integration platform functions as a mediator between business intelligence applications (such as applications 206) and databases (such as databases included within data system 222) from which information is requested.

Figure 3:
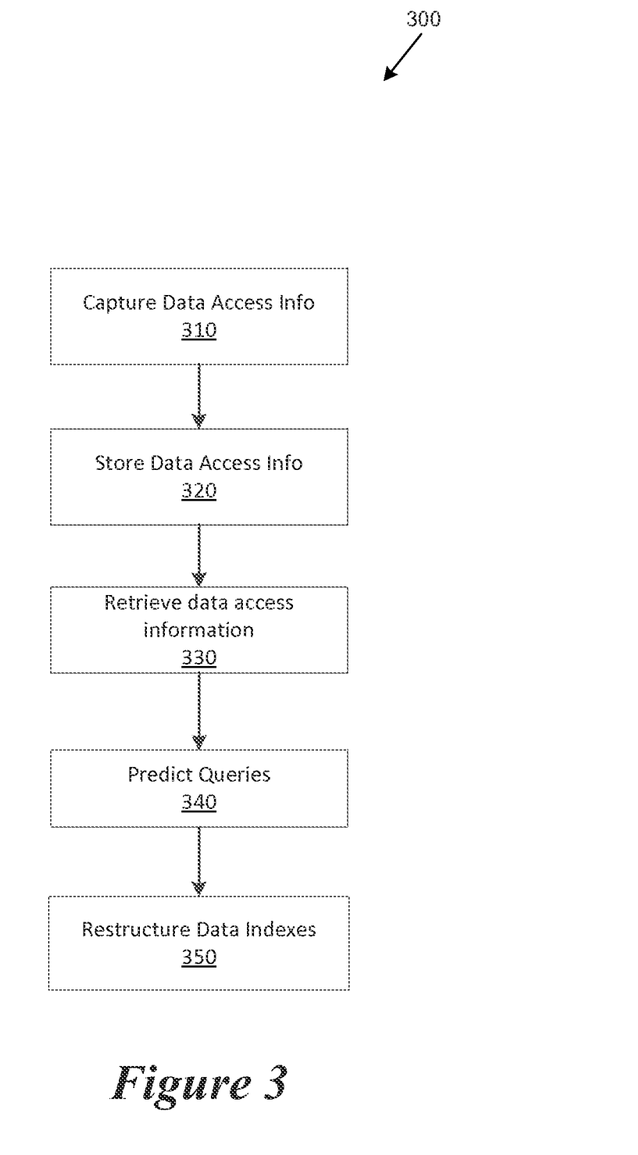
FIG. 3 shows a flow chart of the operation of dynamic data index restructure system.

Referring to FIG. 3, a flow chart of the operation of dynamic data index restructure system 201 is shown. In certain embodiments, the dynamic data index restructure system 201 includes some or all of the functions of the dynamic data index restructure module 118.

More specifically, operation begins at step 310 by captures data access information, including crowdsourced data access information, from a plurality of devices accessing one or more business intelligence databases. Next, at step 320, the data access information is stored within a usage pattern repository. Next at step 330, dynamic data index restructure system 201 retrieves the data access information from the usage pattern repository. In certain embodiments, the retrieval is customizable to retrieve query patterns based upon predefined criteria. For example, the predefined criteria can include one or more of certain products (e.g., the top performing products), region, as well as predefined users of the database (e.g., the users who are most active, have an indicated importance within an organization (e.g., a certain job title or rank above a certain level) or have more than a predefined amount of experience working with the database).

Next at step 340, the dynamic data index restructure system 201 predicts queries based upon the information stored within the usage pattern repository. In certain embodiments, the prediction speculates data access patterns based on a certain number of retrieved queries (e.g., the top 15 percent of retrieved queries) from users accessing the database within the business intelligence architecture. Also, in certain embodiments, the prediction uses predictive crowdsourcing to estimate the query patterns and optimizing the data access for complex queries. The predictive crowdsourcing involves obtaining information on the crowd sourced device 226 and mashing the information with user data access patterns substantially in real time (i.e. without noticeable delay when processing) to predict optimal query patterns.

Next, at step 350, the dynamic data index restructure system 201 restructures data indexes within a business intelligence architecture based on usage patterns so as to support queries most likely to be generated by users of the business intelligence architecture. For example, the dynamic data index restructure system 201 would obtain wide data files and reshape the data files into long form or vice versa. Other examples of the restructuring include some or all of: stacking, sorting, and unstacking of data.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a dynamic data index restructure operation within a business intelligence architecture, comprising:
   determining usage patterns of queries within the business intelligence architecture, wherein the usage patterns are determined using predictive crowdsourcing to estimate the usage patterns of queries;
   identifying a data index used for generating a query within the business intelligence architecture; and
   restructuring the data index within the business intelligence architecture based on the estimated usage patterns and based on predefined criteria, the restructuring supporting queries that are predicted to be generated, but not yet generated, by users of the business intelligence architecture, the restructuring comprising pre-processing at least a portion of data included in the data index corresponding to queries that are predicted to be generated, but not yet generated, by users of the business intelligence architecture, the at least the portion of data included in the data index being restructured based on predefined criteria, the restructuring including identifying a wide data file and reshaping the data file into long form.

2. The method of claim 1, wherein:
   the determining usage patterns is performed via a dynamic data index restructure agent.

3. The method of claim 2, wherein:
   the dynamic data index restructure agent is positioned between a business intelligence application and a business intelligence database.

4. The method of claim 1, wherein:
   the determining usage patterns is performed via a predictive engine, the predictive engine speculating data access patterns based on a certain number of retrieved queries from users accessing a database within the business intelligence architecture.

5. The method of claim 4, wherein:
   the predictive engine is customizable to retrieve query patterns based upon predefined criteria.

6. The method of claim 1, wherein the pre-processing at least the portion of data included in the data index corresponding to queries that are predicted to be generated, comprises at least one of:
   reshaping the portion of data included in the data index corresponding to queries that are predicted to be generated included in the data index into long form;
   stacking the portion of data included in the data index corresponding to queries that are predicted to be generated;
   sorting the portion of data included in the data index corresponding to queries that are predicted to be generated; and
   unstacking the portion of data included in the data index corresponding to queries that are predicted to be generated.

7. A system, comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
      determining usage patterns of queries within a business intelligence architecture;
      identifying a data index used for generating a query within the business intelligence architecture, wherein the usage patterns are determined using predictive crowdsourcing to estimate the usage patterns of queries; and
      restructuring the data index within the business intelligence architecture based on the estimated usage patterns and based on predefined criteria, the restructuring supporting queries that are predicted to be generated, but not yet generated, by users of the business intelligence architecture, the restructuring comprising pre-processing at least a portion of data included in the data index corresponding to queries that are predicted to be generated, but not yet generated, by users of the business intelligence architecture, the at least the portion of data included in the data index being restructured based on predefined criteria, the restructuring including identifying a wide data file and reshaping the data file into long form.

8. The system of claim 7, wherein:
   the determining usage patterns is performed via a dynamic data index restructure agent.

9. The system of claim 8, wherein:
   the dynamic data index restructure agent is positioned between a business intelligence application and a business intelligence database.

10. The system of claim 7, wherein;
    the determining usage patterns is performed via a predictive engine, the predictive engine speculating data access patterns based on a certain number of retrieved queries from users accessing a database within the business intelligence architecture.

11. The system of claim 10, wherein:
    the predictive engine is customizable to retrieve query patterns based upon predefined criteria.

12. The system of claim 7, wherein the pre-processing at least the portion of data included in the data index corresponding to queries that are predicted to be generated, comprises at least one of:
- reshaping the portion of data included in the data index corresponding to queries that are predicted to be generated included in the data index into long form;
- stacking the portion of data included in the data index corresponding to queries that are predicted to be generated;
- sorting the portion of data included in the data index corresponding to queries that are predicted to be generated; and
- unstacking the portion of data included in the data index corresponding to queries that are predicted to be generated.

13. A non-transitory, computer-readable storage medium embodying computer program code, the computer program code comprising computer executable instructions configured for:
- determining usage patterns of queries within a business intelligence architecture, wherein the usage patterns are determined using predictive crowdsourcing to estimate the usage patterns of queries;
- identifying a data index used for generating a query within the business intelligence architecture; and
- restructuring the data index within the business intelligence architecture based on the estimated usage patterns and based on predefined criteria, the restructuring supporting queries that are predicted to be generated, but not yet generated, by-users of the business intelligence architecture, the restructuring comprising pre-processing at least a portion of data included in the data index corresponding to queries that are predicted to be generated, but not yet generated, by users of the business intelligence architecture, the at least the portion of data included in the data index being restructured based on predefined criteria, the restructuring including identifying a wide data file and reshaping the data file into long form.

14. The non-transitory, computer-readable storage medium of claim 13, wherein:
- the determining usage patterns is performed via a dynamic data index restructure agent.

15. The non-transitory, computer-readable storage medium of claim 14, wherein:
- the dynamic data index restructure agent is positioned between a business intelligence application and a business intelligence database.

16. The non-transitory, computer-readable storage medium of claim 13, wherein:
- the determining usage patterns is performed via a predictive engine, the predictive engine speculating data access patterns based on a certain number of retrieved queries from users accessing a database within the business intelligence architecture.

17. The non-transitory, computer-readable storage medium of claim 16, wherein:
- the predictive engine is customizable to retrieve query patterns based upon predefined criteria.

* * * * *